No. 678,940. Patented July 23, 1901.
R. B. CHARLTON.
MACHINE FOR SAWING BARS OF IRON INTO LENGTHS.
(Application filed Oct. 17, 1900.)
(No Model.) 4 Sheets—Sheet 1.
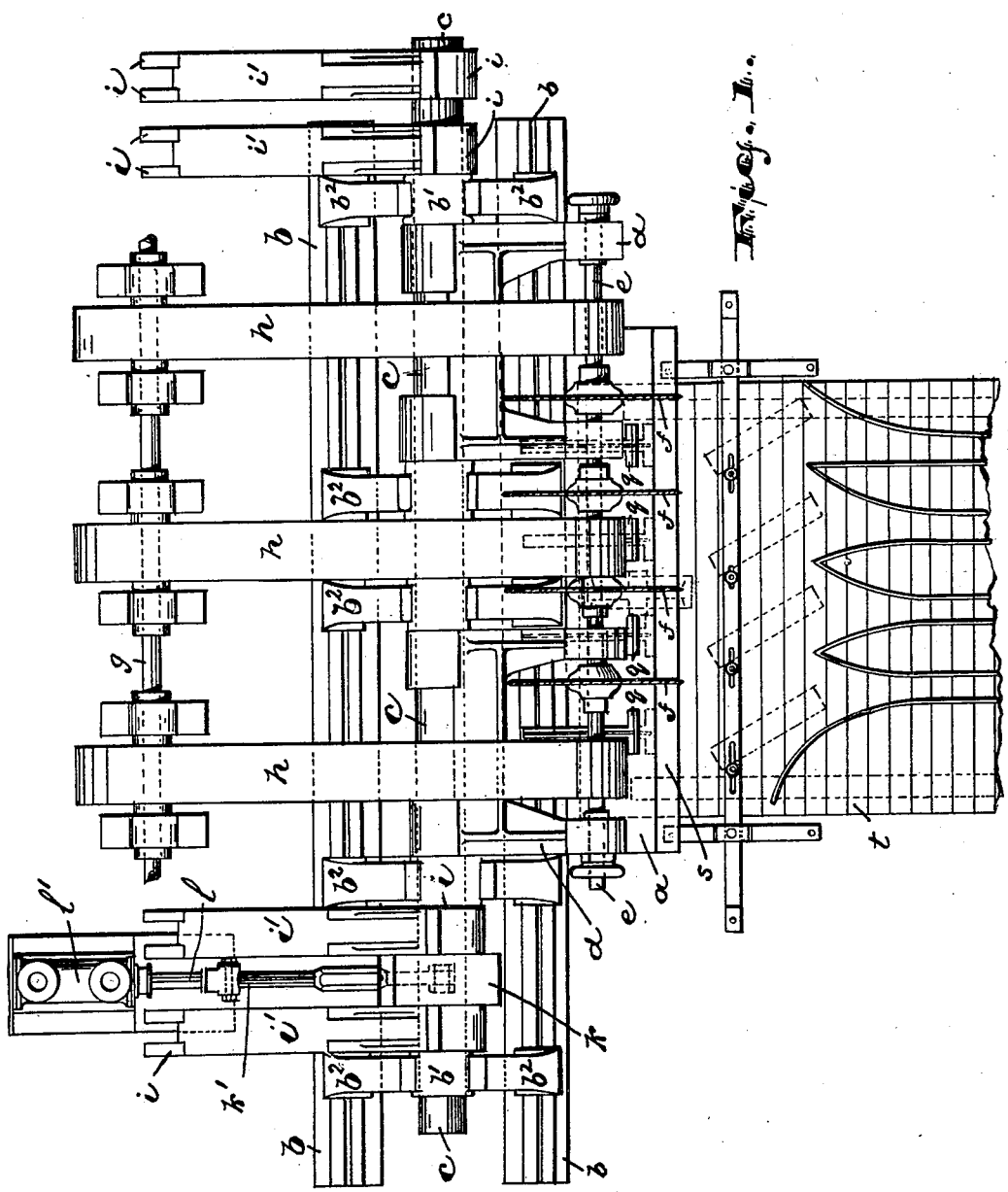
WITNESSES: INVENTOR:
Richard B. Charlton,
BY
ATTORNEYS

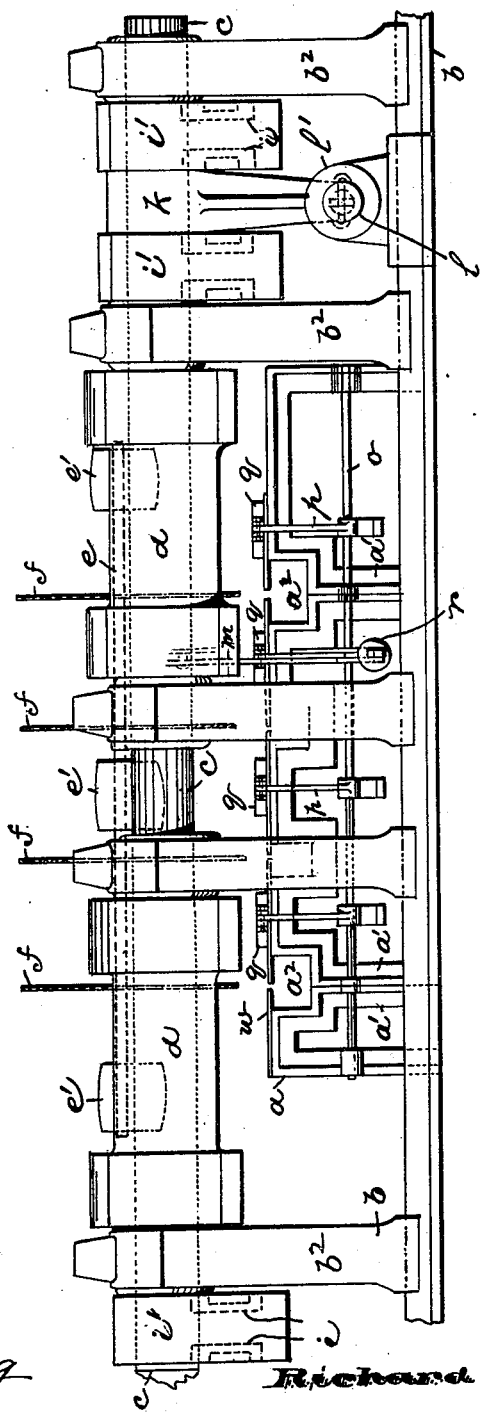

No. 678,940. Patented July 23, 1901.
R. B. CHARLTON.
MACHINE FOR SAWING BARS OF IRON INTO LENGTHS.
(Application filed Oct. 17, 1900.)
(No Model.) 4 Sheets—Sheet 3.
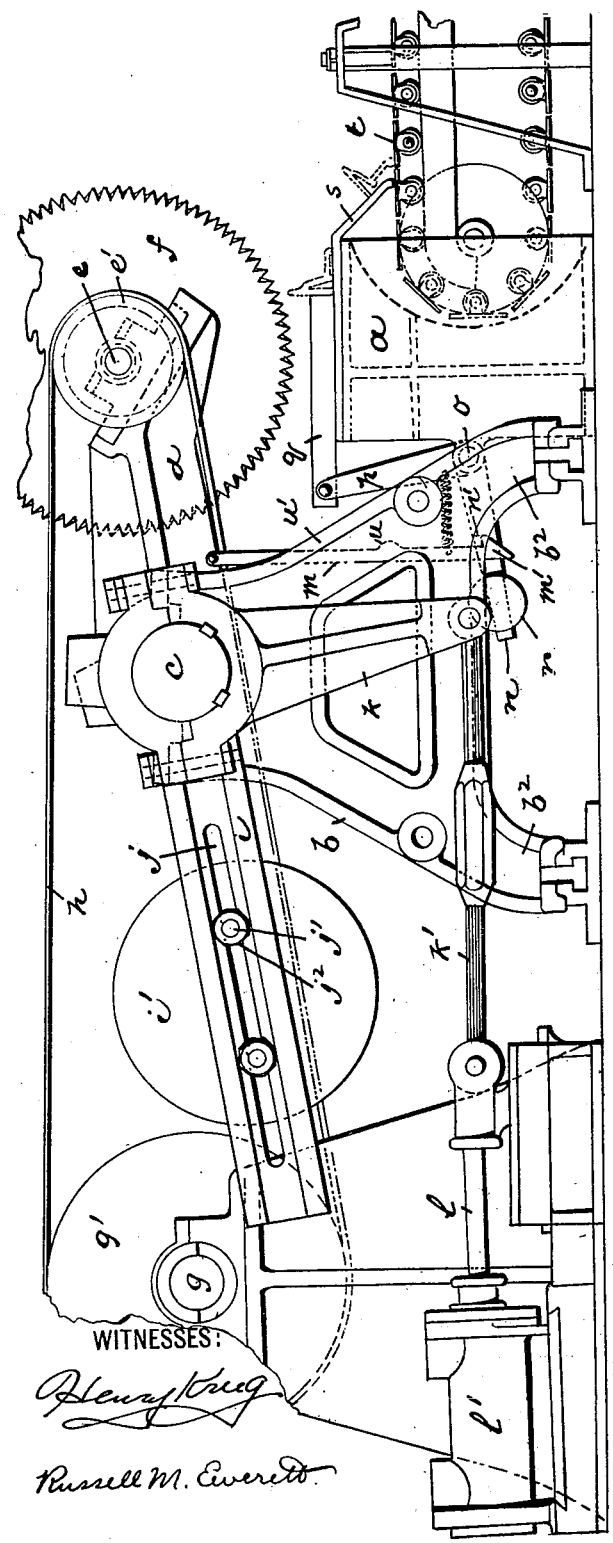
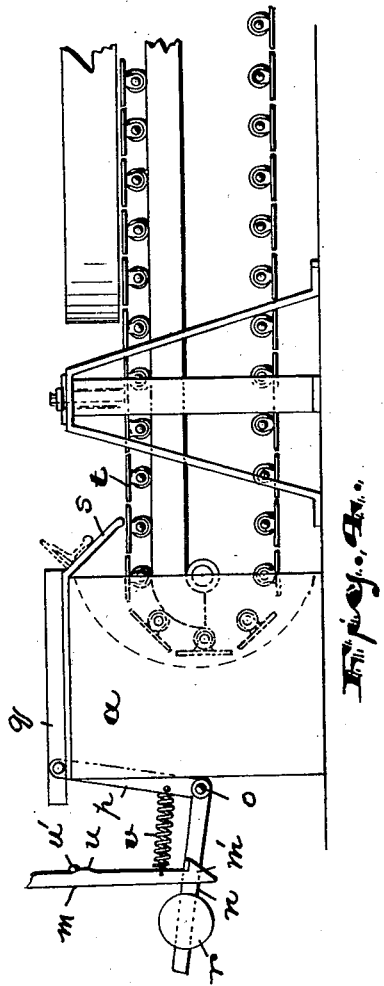
WITNESSES:
INVENTOR:
Richard B. Charlton,
BY
Drake & Co
ATTORNEYS.

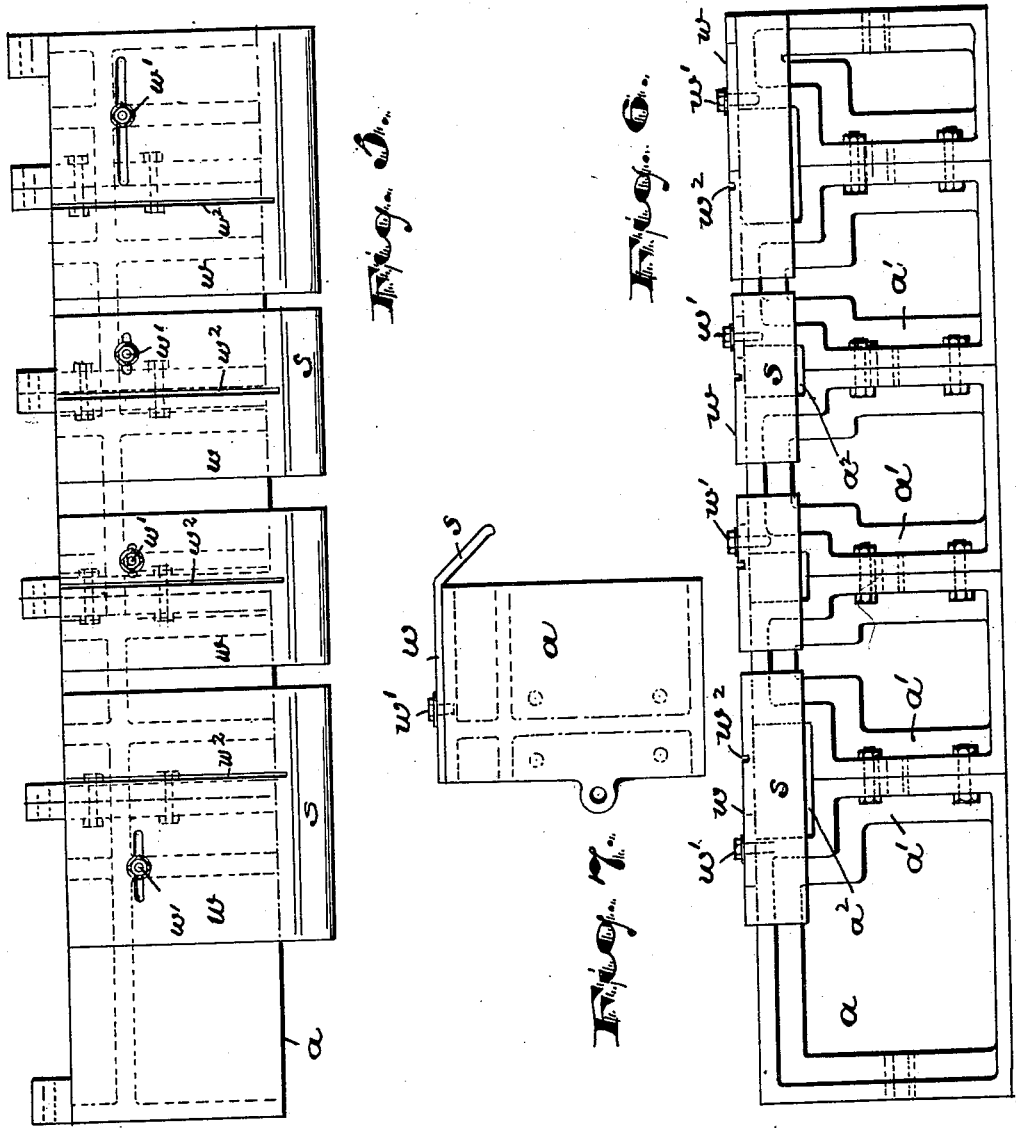

UNITED STATES PATENT OFFICE.

RICHARD B. CHARLTON, OF MILWAUKEE, WISCONSIN, ASSIGNOR TO CONTINUOUS RAIL JOINT COMPANY OF AMERICA, OF NEW JERSEY.

MACHINE FOR SAWING BARS OF IRON INTO LENGTHS.

SPECIFICATION forming part of Letters Patent No. 678,940, dated July 23, 1901.

Original application filed April 25, 1900, Serial No. 14,233. Divided and this application filed October 17, 1900. Serial No. 33,342. (No model.)

*To all whom it may concern:*

Be it known that I, RICHARD B. CHARLTON, a citizen of the United States, residing at Milwaukee, in the county of Milwaukee and State of Wisconsin, have invented certain new and useful Improvements in Machines for Sawing Bars of Iron into Lengths; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The general object of this invention is to facilitate the manufacture of the railway fishplate shown in United States Patent No. 637,723, granted to Frederick T. Fearey on the 21st day of November, 1899, the present application being a division of my original application, filed April 25, 1900, Serial No. 14,233.

The specific purpose and use of the devices shown in this application are to enable the heated bars of iron after having been rolled and bent into the proper cross-sectional shape to be expeditiously cut into proper lengths to form fish-plates, the operation being performed without hand labor and the sawed fish-plates being automatically removed from the table. It will be obvious, however, that the invention can be used for sawing into desired lengths heated bars of any description.

The invention consists in the improved machine for sawing heated bars of iron into given lengths and in the arrangements and combinations of parts of the same, all substantially as will be hereinafter set forth and finally embraced in the clauses of the claim.

Referring to the accompanying drawings, in which like letters of reference indicate corresponding parts in each of the several views, Figure 1 is a plan of the sawing-machine. Fig. 2 is a rear elevation of the same, certain power-transmitting means being omitted. Fig. 3 is a side elevation of the entire sawing-machine, and Fig. 4 is a side elevation of the saw-bench and showing means for removing the sawed fish-plates therefrom. Fig. 5 is a plan, Fig. 6, a front view, and Fig. 7 an end view, of the saw-bench.

In said drawings, $a$ indicates a saw bench or table onto which the bars of iron to be cut are delivered by any suitable means while still in a heated condition. Adjacent to said bench and longitudinally parallel thereto is a massive bed or frame $b$, providing suitable bearings $b'$, in which is mounted a rock-shaft $c$. Said frame is preferably triangular-shaped in end view, as shown in Fig. 3, with spreading legs $b^2$, affording a stable base, and the bearings $b'$, formed at the apex, which is higher than the saw-bench $a$. On said rock-shaft $c$ are fixed arms $d$, extending out over the saw-bench $a$ and carrying the saw-shaft $e$ above said bench, said shaft lying parallel to the rock-shaft $c$ and being adapted to rotate in its bearings in the arms $d$. A gang of circular saws $f$ are fixed upon said saw-shaft to be rotated thereby, said saws being of any suitable number, although four are shown in the drawings. Pulleys $e'$ are also fixed on the saw-shaft to receive belts $h$, transmitting power to the saw-shaft from a driving-shaft $g$, having pulleys $g'$. The saws $f$ are adjustable longitudinally upon the saw-shaft $e$, so that fish-plates of different lengths can be cut—say from twenty-two to thirty inches, more or less. The rock-shaft $c$ also has fixed arms $i$, which project rearwardly away from the saw-bench $a$ in pairs and carry weights $i'$, adapted to counterbalance the weight of the saw-shaft $e$ and saws thereon. These counterbalance-weights $i'$ are each held between two arms of a pair and are adapted to be slid thereon toward or from the rock-shaft to secure adjustment, the arms being preferably slotted in side view, as at $j$, to receive bolts $j'$, passing transversely through the weight and said slots and being headed at one end and provided at the other with a clamping-nut $j^2$. By adjusting the weights $i'$, therefore, to nicely balance the saws and their connections it is evident that the rock-shaft $c$ can be easily oscillated in its bearings to raise and lower the saws with respect to the saw-bench $a$ and work thereon. To secure such oscillation of the rock-shaft, the same is provided with an arm $k$, fixed to said shaft and projecting downward therefrom, as is clearly shown in Fig. 3. The extremity of said arm is joined by a connecting-rod $k'$ to a pushing-piston $l$, working in a cylinder $l'$ and actuated by steam or other suitable motive force. By giving to said piston, therefore, the proper rapidity of stroke it is evident that the rocking shaft will be oscillated to lower the saws while they cut through the bar of iron and then raise them to permit the bar to be slid along for another cut.

To remove the cut fish-plates from the saw-bench, and thus clear the way for the uncut bar to be slid under the saws, a rod $m$, pivoted at its upper end to one of the saw-arms $d$ and being hooked at its lower end, as at $m'$, is provided. When the saws are lowered in cutting through a bar, the said hooked end $m'$ of the rod $m$ catches over a pintle $n'$, projecting from a horizontally-disposed arm $n$, extending rearwardly toward the rock-shaft frame $b$ from a shaft $o$, journaled in bearings on the rear side of the saw-bench. The said arm $n$ is fixed upon the shaft $o$, and other fixed arms $p$ project upward from said shaft at the rear side of the saw-bench and are pivotally connected to the rear ends of pushers $q$, adapted to slide transversely across the saw-table midway between the saws. The arm $n$ is normally held at its lowest position by a weight $r$ on the end of said arm, and this throws the upper end of the arms $p$ away from the saw-bench and draws the pushers $q$ rearward to permit a bar to be slid onto the table to be sawed, the saws being raised. Now as the saws are lowered and sawing takes place the hooked rod $m$ engages the arm $n$, and when the saws are again raised after the fish-plates are sawed apart the shaft $o$ is turned with the arms $p$ and the pushers $q$ are slid forward across the table to push the severed fish-plates onto an incline $s$, from whence they slide onto a conveyer $t$. As the saws and saw-arms reach their highest positions, or sooner, the fish-plates have been pushed onto the conveyer and the hooked rod $m$ is released from the arm $n$ by a boss or cam $u$ on the rod striking a pin or bearing $u'$ on the bed-frame $b$. This permits the weight $r$ to fall and restores the arms $n$ $p$ to normal positions, with the pushers drawn back to clear the table for the next bar to be sawed. A spring $v$ preferably holds the rod $m$ positively against the stop $u'$.

The saw-table $a$ is preferably formed of sections $a'$, bolted together and providing transverse recesses or troughs $a^2$ for the saws $f$ to descend into. Upon the top of said sections $a'$ and serving to cover the said recesses $a^2$ are flat auxiliary plates $w$, slotted to receive the saws and having at their front edges the inclines $s$, which are preferably of one integral piece of sheet metal with the plates $w$. Said plates $w$ are adjustable in the lengthwise direction of the bench, so as to permit the slots $w^2$ therein to be brought into proper coincidence with the saws when said saws are adjusted, and are held to the bench by bolts $w'$ or other suitable means for clamping them immovably in any given position.

Having thus described the invention, what I claim as new is—

1. In a machine for sawing bars of iron into lengths, the combination of a saw-bench, a rock-shaft journaled adjacent to said bench and having arms saws carried by said arms, means for oscillating said rock-shaft, pushers working transversely across the saw-bench to remove the sawed pieces and means for transmitting the alternating motion of the rock-shaft to said pushers to secure a reciprocating motion of the pushers, substantially as set forth.

2. In a machine for sawing bars of iron into lengths the combination of a saw-bench, a rock-shaft having arms and saws carried by said arms, means for oscillating said rock-shaft, and reciprocating pushers operated by the oscillating rock-shaft to push the sawed pieces off the saw-bench, substantially as set forth.

3. In a machine for sawing bars of iron, the combination of a saw-bench, a rock-shaft having arms and saws carried on said arms, means for oscillating said rock-shaft to raise and lower the saws, pushers sliding transversely on the saw-bench top, and means connecting said pushers to the rock-shaft arms, whereby as said arms lift the saws away from the bench the pushers are slid forward to push the bars just sawed off the bench, and as said arms drop again the pushers are drawn back out of the way, substantially as set forth.

4. In a machine for sawing bars of iron, the combination with a saw-bench, saws and means for raising and lowering said saws with respect to the bench, of pushers sliding back and forth the saw-bench to remove the sawed pieces and automatically reciprocated by raising and lowering the saws, substantially as set forth.

5. The combination with a saw-bench and a saw carried by a tilting frame and adapted to be raised or lowered with respect to the bench, of a pusher working transversely of the bench, a bell-crank lever fulcrumed at the side of the bench and being pivoted at its upper arm to the pusher, and means connecting the lower arm to the tilting frame, substantially as set forth.

6. The combination with a saw-bench and a saw carried by a rocking frame adapted to raise or lower the saw with respect to the bench, of a pusher sliding transversely upon the bench-top, a bell-crank lever fulcrumed at the side of the bench and having its upwardly-extending arm pivotally connected to the pusher, a weight on the other arm whereby the pusher is normally drawn partially off the bench, and tripping means on the rocking frame for raising said weighted arm of the lever, substantially as set forth.

7. The combination with a saw-bench and a gang of saws carried by a rocking frame adapted to raise or lower them with respect to the bench, of pushers adapted to slide across the bench-top, a shaft having bearings at the side of the bench and provided with fixed arms extending upward and each pivoted to a pusher, a fixed arm projecting outward from said shaft, a hooked lever on the tilting saw-frame and adapted to engage said fixed arm, and means for releasing said lever from said arm, substantially as set forth.

8. The combination with the saw-bench and rocking frame carrying the saws, of pushers $q$, connected to arms $p$, fixed on a shaft $o$, a weighted arm $n$, projecting horizontally or nearly so from the shaft $o$, and having a lug or pintle thereon, a lever pivoted to the rocking frame and hooked at its lower end to engage said lug or pintle and having a boss or cam adapted to engage a fixed pin or bearing when the lever is raised and release the said hooked end, said fixed pin or bearing, and a spring normally holding the lever against the pin, substantially as set forth.

9. In a machine for sawing bars of iron into lengths, a saw-bench comprised of sections bolted together and being recessed at the upper edges of their meeting faces, whereby transverse troughs for the saws to work in are provided in the completed bench, said saws, and an adjustable top plate for the bench, substantially as set forth.

10. In a machine for sawing bars of iron, the combination with a gang of circular saws and means for operating the same, of a saw-bench having transverse troughs or recesses in which the saws may work, and plates covering said troughs or recesses, each plate being slotted to receive the saw and being adjustable upon the bench at right angles to the saw, and means fastening said plates to the bench, substantially as set forth.

11. The combination of a rocking frame carrying a gang of saws, a saw-bench having transverse troughs to receive said saws, top plates on said bench over said troughs and being slotted for the saws and overreaching the front side of the bench and being bent downward to form inclines, means holding said plates to the bench while permitting adjustment of the slots to the saws, pushers sliding transversely of the bench from the rear side, and means connecting said pushers to the rocking frame whereby a raising of the saws will operate the pushers to push the sawed pieces onto the inclines at the front of the bench, substantially as set forth.

In testimony that I claim the foregoing I have hereunto set my hand this 9th day of October, 1900.

RICHARD B. CHARLTON.

Witnesses:
M. E. CHRISTENSEN,
M. G. NOWAK.